United States Patent [19]

Jaeger

[11] 4,301,467
[45] Nov. 17, 1981

[54] PROCESS FOR THE OPTOELECTRONIC TRANSMISSION OF AN IMAGE

[75] Inventor: Walter Jaeger, Cureglia, Switzerland

[73] Assignee: GX-Holding AG, Switzerland

[21] Appl. No.: 71,074

[22] Filed: Aug. 30, 1979

[30] Foreign Application Priority Data

Sep. 1, 1978 [CH] Switzerland .................. 9241/78

[51] Int. Cl.³ ............................................. H04N 9/04
[52] U.S. Cl. .................................... 358/41; 358/44; 358/49
[58] Field of Search ................. 358/41, 44, 49, 55, 358/66

[56] References Cited

U.S. PATENT DOCUMENTS

| 2,465,652 | 3/1949 | Legler | 358/49 |
| 2,552,464 | 5/1951 | Siezen | 358/66 |
| 2,600,590 | 6/1952 | Thomas | 358/55 |
| 3,591,706 | 7/1971 | Parker-Smith | 358/49 |
| 3,668,304 | 6/1972 | Eilenberger | 358/49 |
| 3,787,614 | 1/1974 | Waldspurger | 358/49 |

Primary Examiner—Michael A. Masinick
Attorney, Agent, or Firm—Eric P. Schellin

[57] ABSTRACT

In order to permit a camera tube having a sensitivity diminishing towards the edge and/or having geometrical distortion to be used in a single-tube camera, two mutually symmetrical different-colored images are produced. At least one of the two images is in addition optically coded in different colors in stripe fashion by means of a strip filter. The video signals formed sequentially by the likewise symmetrical image scanning of an electron beam are split into their components in the decoding circuit and then converted in the preparation circuit, if necessary after intermediate storage, into the broadcast-compatible R,G,B signals.

26 Claims, 10 Drawing Figures

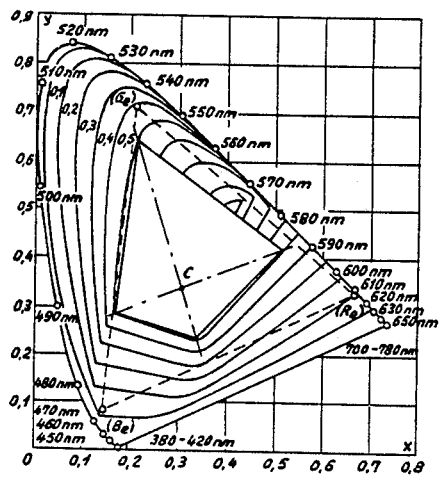
Fig. 7
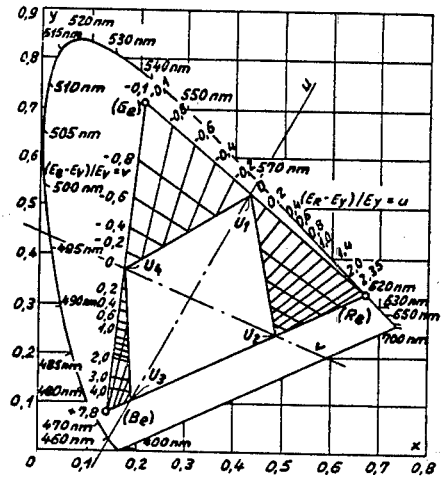
Fig. 8
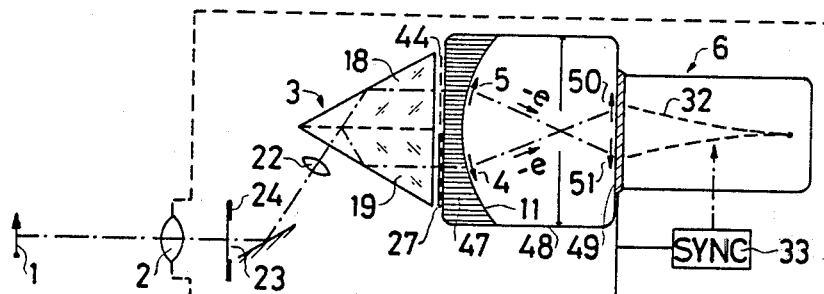
Fig. 9
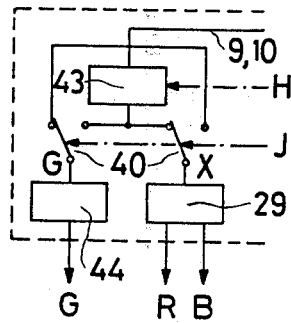
Fig. 10
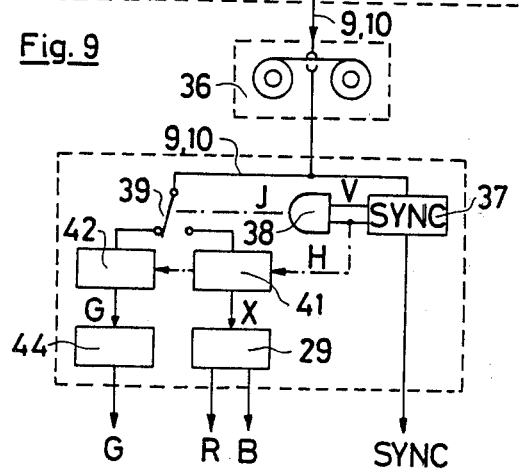

PROCESS FOR THE OPTOELECTRONIC TRANSMISSION OF AN IMAGE

The present invention concerns a process for the optoelectronic transmission of a given image which radiates in at least two mutually different wavelength ranges and/or wavelength distributions, the arrangement being such that the said image is reproduced by means of a lens and an optical picture splitter simultaneously as two images side by side on the photosensitive coating of a single photoelectric transducer, or of two separate such transducers, and that the said two images are directly or indirectly converted into two electric video signals by raster scanning of the photosensitive coating of the photoelectric transducer or transducers.

In a known process for transmitting given colour images for television purposes, the given image is optically reproduced three times, for instance, side by side on one and the same photosensitive coating of a camera tube, and the reproduced images are raster-scanned by an electron beam. In this, the reproduced images are positioned side by side in equal alignment as are postage stamps in a block. The same points of the image are positioned asymmetrically to the longitudinal axis of the optical elements and to the geometrical axis of the camera tube. Elements cause symmetrical gradations and geometrical distortions. The camera tube presents considerable geometrical distortions and sensitivity variations, both factors acting symmetrically to the camera axis. For image reproduction, it is necessary to bring the three reproduced images into register and to reproduce each image point in its intensity in correct proportion. This involves extensive optical and/or electronic corrections of geometry and gradation.

The object of the present invention is to provide a process which eliminates the need for such correction devices, which are extremely difficult to set and adjust, and which permits the use of camera tubes presenting heavy geometrical distortion, such as image amplifier tubes.

The process according to the invention is characterized in that two images which are positioned side by side and mutually symmetrically in an at least approximately plane surface and which between themselves present a symmetrical brightness distribution for a noncolour given image, are produced and scanned in such a manner that the scanning rasters are at least approximately mutually symmetrical.

For simplicity of the optical system and the scanning, it is advantageous to produce the two images on the photosensitive coating of a camera tube, and to scan the two images directly or indirectly by means of an electron beam.

For compatibility with the usual television systems, it is advantageous to produce on the photosensitive coating two images which are mirrorcongruent.

To obtain two images which are symmetrical to the longitudinal axis of the camera tube, it is further advantageous to scan the images produced on the photosensitive coating in such a manner that the scanning rasters are mutually symmetrical and preferably mirror-reversed, and that, in image and line scanning, the latter is effected according to two half-image rasters which are mutually displaced by half a line and "dovetailed". In this, it is advantageous, for producing the two images, to use a picture splitter having a geometrico-optically homogeneous, partly transmissive, reflecting plane which partly passes every incident beam undeflected and partly reflects it mirror-wise, and further to use two planes which each cause a mirror deflection, one of which is arranged in front of, the other behind, the said partly transmissive reflecting plane, in such a manner that the line of intersection between the two deflecting planes is positioned in the partly transmissive plane, and that the inclination angles ($\alpha$) of the deflecting planes with respect to the partly permeable plane are equal.

It is further advantageous to use a picture splitter having two optical 30/60/90° prisms which are permanently interconnected by a partly transmissive coating.

The process according to the present invention uses only two reproduced images. For correct colour reproduction, however, three colour separations are required. This can be achieved by using a lens to produce an intermediate image which is reproduced on the photosensitive coating by means of an intermediate optical assembly and the succeeding picture splitter, in such a manner that an image limitation is effected preferably in the intermediate image plane.

In this, it is advantageous to adopt an arrangement wherein at least one strip filter which filters out two mutually different wavelength ranges and/or wavelength distributions is used to produce at least one stripfiltered image on the photosensitive coating, and wherein the optically coded electric video signals developed in direct or indirect scanning are split up by electric decoding means according to the coding.

For optimal simplicity of signal transmission, it is advantageous to use a strip filter arranged in the intermediate image plane and to arrange, between picture splitter and photosensitive coating, a uniformly filtering filter in one beam channel, or two uniformly filtering and mutually different filters in the two beam channels, for which purpose the colour of the filters is selected in such a manner that scanning of the photosensitive coating results in electric video signals having coded quotas corresponding to at least three different colour separations.

To avoid flicker, it is advantageous to scan the reproduced images time-sequentially by means of a switching mechanism and to transmit only one of the electric video signals at any given moment.

For the compensation of all asymmetries of optical and electronic type, it is advantageous to produce two reproduced images which are at least approximately congruent and are mutually pointsymmetrical, and to store the video signals corresponding to a raster line in the intermediate memory for the duration of a line period.

For the purpose of using a simple scanning raster, it is advantageous to produce two images which present a symmetry axis at least approximately perpendicular to the line direction, and to store the video signals corresponding to a raster line in the intermediate memory for the duration of a line period.

As the image produced from the intermediate memory generally has blurred edges, it is advantageous to use a lens to produce an intermediate image which is reproduced on the photosensitive coating by means of an intermediate optical assembly and the succeeding picture splitter, in such a manner that an image limitation is effected preferably in the intermediate image plane.

For optimal geometrical utilization of the surface of the photosensitive coating, it is advantageous to produce two images having a symmetry axis extending parallel to the line direction, and to store the video signals corresponding to a half-image scan in the intermediate memory for at least the duration of a half-image period.

In using an interlaced raster, it is advantageous to use an identification signal for the purpose of assigning the electric video signals to the colour separation scanned in each case, and to form the identification signal from the horizontal and vertical synchronization signals by means of a coincidence circuit.

The invention is now to be illustrated by way of example with reference to the drawing, in which FIG. 1 shows, diagrammatically, an example of an arrangement for the performance of the process according to the present invention;

FIGS. 7 and 8 show graphs giving examples of light filter factors;

FIG. 9 shows, diagrammatically, an application of the process according to the invention in conjunction with a light amplifier tube; and FIG. 10 shows a variant of a detail of the diagram given in FIG. 9.

Figure 1:
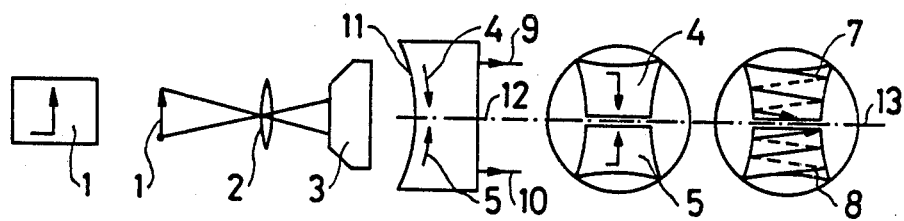

FIG. 1 shows, in diagram, that the subject 1 is reproduced as images 4 and 5 on the camera tube 6 by means of the lens 2 and the picture splitter 3. Moreover, the reproduced images 4 and 5 are converted into the video signals 9 and 10 by scanning according to the rasters 7 and 8. The images 4 and 5 are positioned on the generally plane surface 11.

The lens 2 and the picture splitter 3 distort the images 4 and 5 to a cushion-form, for instance. As the images 4 and 5 are symmetrical to the axis 12, the distortions also are symmetrical. It is therefore possible, by two likewise symmetrical scans 7 and 8, to bring the distorted images into register without difficulty. This is best achieved when the symmetry axis 13 of the scans 7,8 coincides with the symmetry axis 12 of the images 4 and 5.

Instead of a camera tube 6, it is possible to use a photocell mosaic, such as a chargecoupled device (CCD), with the scan proceeding by image points and lines.

The scans 7,8 may proceed by the interlaced method (as represented in the drawing) in order to make the signal broadcasting-compatible. It is of course possible instead to use other scanning methods, such as PPI scanning for radar application.

Figure 2:
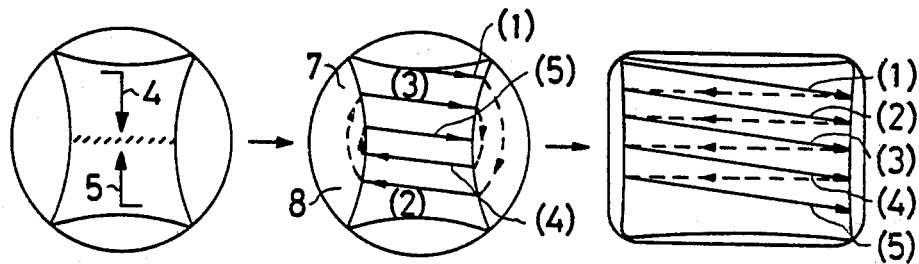
FIGS. 2, 3, 4 show the position of the two symmetrical reproduced images; the scanning rasters required for the scanning thereof; and the associated reproduction rasters.

FIG. 2 shows a point-symmetrical position of two congruent images with the associated linesequential scanning rasters and the ordinary TV reproduction raster. The time sequence of the raster lines is indicated here as well as in FIGS. 3 and 4 with figures set in parentheses. In this, a raster of only five lines is assumed for all three images.

Figure 3:
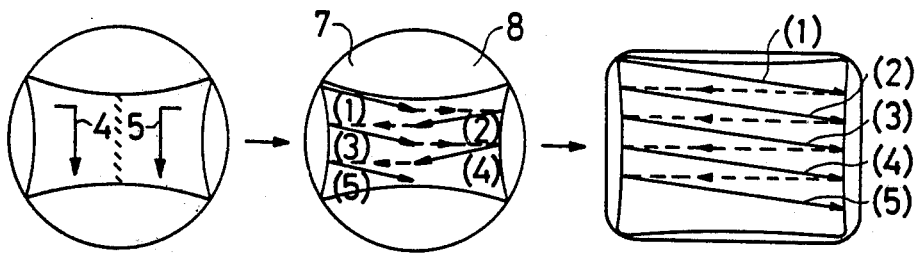

FIG. 3 shows the use of two mirror symmetrical images, with the symmetry axis running perpendicular to the line direction.

Figure 4:
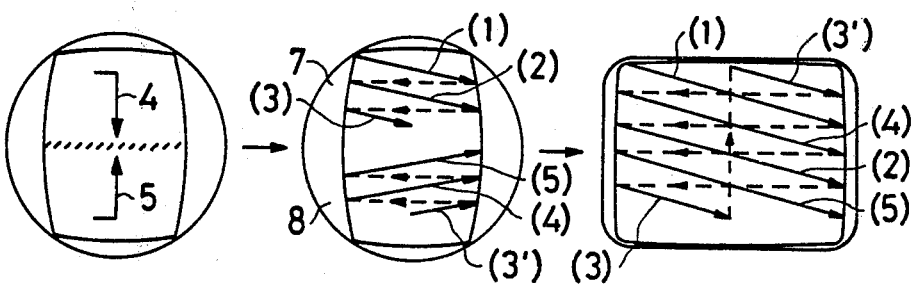

FIG. 4 shows the use of two mirror symmetrical images where the symmetry axis runs parallel to the line direction and where the scanning is image-sequential, and not time-sequential as in FIGS. 2 and 3.

Figure 5:
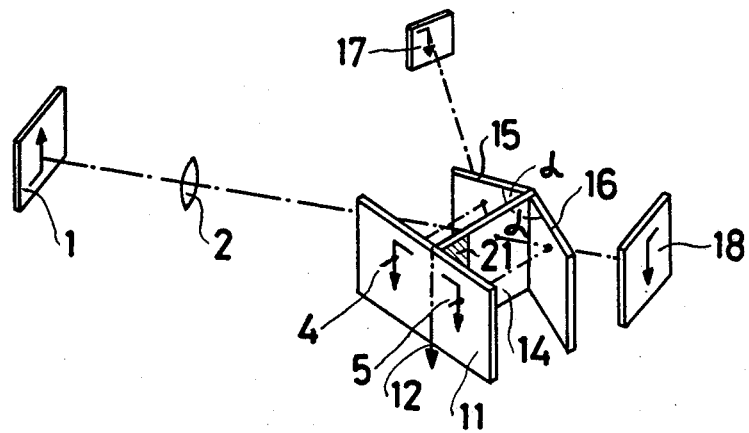
FIG. 5 shows, in perspective, an embodiment of the picture splitter.

FIG. 5 shows an embodiment of a symmetrical picture splitter and its action. The lens 2 reproduces the subject 1 (without picture splitter) in inverted form in the image plane 18. The picture splitter comprises a plane 14 that is partly permeable and partly reflecting. In the absence of the mirrors 15, the plane 14 reproduces the subject 1 in the image plane 17. Use of the mirrors 15 and 16 results in forming the images 4 and 5 which are mutually symmetrical and are positioned in the plane 11.

The two images 4 and 5 present a symmetry axis 12 which corresponds to the line of intersection of the image plane 11 with the partly permeable plane 14.

To prevent the two images 4 and 5 from overlapping, the part of the plane 14 which is not used as a partly reflecting mirror and which is positioned towards the image plane 11 is impermeable and absorptive to light.

The mirrors 15 and 16 may be replaced by totally reflecting prism surfaces.

Figure 6:
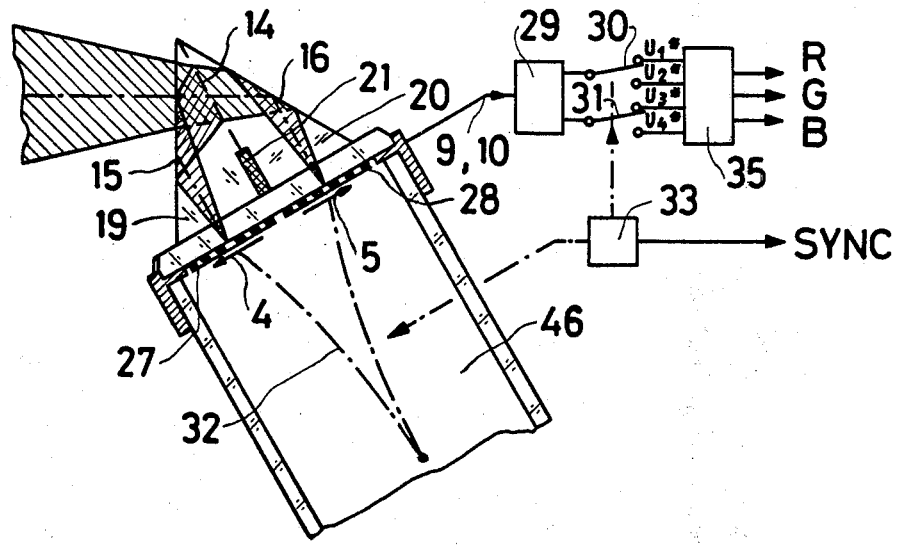
FIG. 6 shows a section through a second embodiment of a picture splitter arranged on a camera tube; and a block diagram of the signalprocessing circuit connected thereto.

FIG. 6 shows another embodiment of the picture splitter, arranged on a camera tube, and a block diagram of the signal-processing circuit connected thereto.

In this embodiment, for the purpose of producing the two images, use is made of a geometricooptically homogeneous, partly transmissive, reflecting plane 14 which partly passes each incident beam undeflected and partly reflects it mirror-wise, and use is further made of two planes 15 and 16 each causing a mirror-deflection. The partly transmissive plane 14 is positioned between the longer surfaces on the shorter triangle sides, while the reflecting planes 15 and 16 are positioned on the surfaces on the hypotenuses, of two 30/60/90° prisms 19 and 20 which are permanently interconnected by means of epoxy resin, for instance.

Two raster filters 27 and 28 are arranged between the prisms 19,20 and the planes on which the images 4 and 5 appear.

When the images 4 and 5 are scanned by the electron beam 32 in the camera tube 46, the coded video signals 9 and 10 are produced. The two raster filters 27 and 28 produce images in the form of stripes which, owing to the locally different permeability of the raster filters 27 and 28, correspond to two different colour separations. Scanning by the electron beam 32 results in a video signal which contains the image information of different colour separations in a frequency-multiplexed form. The deflection signals from the synchronization centre 33 move the electron beam 32 across the stripe-wise different-coloured images. The beam thus produce the video signals 9 and 10 which each correspond to two colour separations in frequency-multiplexed form. The frequency-selective arrangement 29 causes each of the frequency-multiplexed signals 9 and 10 to be split into its components. Each of these components is applied by the switches 30 and 31 to the four inputs $U_1^*$, $U_2^*$, $U_3^*$ and $U_4^*$ of the matrix 35, according to the scanning of the images 4 and 5. The matrix 35 thus produces the video signals R, G and B which at any moment correspond to the colour separation just scanned.

To ensure flicker-free reproduction of noncolour portions of the given image, two such stripewise filtered images are produced in each case on the photosensitive coating of the camera tube 46, in such a manner that each of the two decoded electric video signals corresponds to a pair of complementary colours.

To ensure that coloured parts also of the given image, that is, of the subject 1, are reproduced as flicker-free as possible, use is made of such strip filters as ensure that all four complementary colours lie on the same curve of constant relative albedo for body colours with the optimal colours, under studio lighting, as shown in FIG. 7.

To optimize colour reproduction subjectively, use is made, as shown in FIG. 8, of strip filters of factors which correspond at least approximately to the primary colours $U_1$, $U_2$, $U_3$ and $U_4$ of human visual sensation and which largely correspond to the intersection points of the u and v axes of television with the colour triangle $(R_3)$, $(G_e)$, $(B_e)$ used in television. The u and v axes are defined by $$u = (E_R - E_Y)/E_Y \text{ and } v = (E_B - E_Y)/E_Y$$

where $E_Y = 0.3 \cdot E_R + 0.59 \cdot E_G + 0.11 \cdot E_B$. The strip filters 27 and 28 in FIG. 6 or 9 must be near the image plane. Instead, however, it is possible to arrange a two-colour strip filter in the intermediate image plane 23 and, moreover, to arrange two different-coloured optically homogeneous light filters between the prisms 18,19 and the image planes in which the images 4 and 5 appear.

Owing to the symmetrical arrangement of the images 4 and 5 and owing to the image scanning by the electron beam 32, even heavy geometrical distortions are acceptable so long as they arise in symmetrical form.

Formerly, it was practically impossible to use image amplifier tubes for colour reproduction, because they involve heavy geometrical distortion. As FIG. 9 shows, however, they can now be so used owing to the symmetry properties of the process. claimed hereunder. The image amplifier 48 amplifies the images 4 and 5 produced by the glass-fibre optics 47 on the photosensitive coating 45. Thus, on the intermediate coating 49, are formed the two images 50 and 51, which are still symmetrical to the tube axis and which are now scanned time-sequentially by the electron beam 32.

To prevent flicker effects provision is made for storage of the video signals 9 and 10 by the memories 41, 42 and 43 respectively, as shown in FIG. 9 and 10.

It is possible to produce two images as shown in FIGS. 2 and 3, and to store the video signals corresponding to a raster line in the intermediate memory for the duration of a line period.

It is further possible to produce two images as shown in FIG. 4, and to store the video signals corresponding to a raster line in the intermediate memory for the duration of a line period.

It is yet further possible to produce two images as shown in FIG.4, and to store the video signals corresponding to a half-image scan in the in the intermediate memory for at least the duration of a half-image period.

The storage circuits have a limited resolution. Image reproduction is therefore less shape. This can be improved by fitting a crispening circuit 44 on the entry side of the green signal output.

Image repetition requires, besides the memories 41, 42 and 43, a switching mechanism 39 and 40 respectively. Switching must proceed in synchronism and true to phase with the scanning of the images 50,51. To ensure switching that is synchronized and true to phase, provision is made for a coincidence circuit 38, as shown in FIG. 9. In interlaced scanning, it ensures a definite assignment of the synchronization signal J from the coincidence of the horizontal and vertical synchronization signals H and V. The latter are obtained in the synchronization separation circuit 37 from the video signals 9 and 10 respectively.

Because of the inevitable band jitter, a video signal taken from the program memory 36 no longer has an accurate time axis. To ensure that the video signals stored in the intermediate memories 41, 42 and 43 respectively nevertheless produce an image which coincides with the directly produced image reproductions, the storage time is varied by the horizontal signal H, and the stored video signal is called from the memory in such a manner that it exactly coincided in time with the direct video signal.

During transmission of the optically coded video information (image 4 in FIG. 9) which corresponds to a red and a blue colour separation, the frequency band required is smaller than that required during the transmission of the green video information, for instance (image 5 in FIG. 9); accordingly, it is possible during the transmission time of the former images 4 to co-transmit additional information, preferably several sets of language information. As is known, the red information requires only one third, and the blue information only one eighth, of the bandwidth required for transmission of the green information. It is therefore possible to use an auxiliary carrier which is higher than the highest red information to be transmitted, and modulate it in amplitude with the blue information and thus transmit this along with the red information. The bandwidth of this combined signal is only inconsiderably larger than half the bandwidth of the green signal.

Similar relations apply in digital transmission.

What I claim is:

1. A system for optoelectronic transmission of a subject image (1) which radiates in at least two mutually different wavelength ranges and/or wavelength distributions having means for reproducing the subject image (1) including photoelectric transducer means (6) through which a geometrical axis (12) extends and provided with a photosensitive surface (11) intersected by said axis, a lens (2) and optical picture splitter means (3) for simultaneously projecting said subject image into two mirror images of each other (4, 5) of the subject image on the photosenstive surface (11), and raster scanning means for converting the two reproduced images (4, 5) into two electric video signals (9, 10), said two mirror images (4, 5) being positioned side by side and related mutually symmetrically on said surface (11) relative to said geometrical axis (12) with symmetrical brightness distribution and scanned by said scanning means along scanning rasters (7, 8) that are also substantially mutually symmetrical with respect to said geometrical axis of the transducer means.

2. The system according to claim 1 wherein said transducer means comprises a camera tube (46), and said scanning means includes means for emitting an electron beam (32) to scan said two images.

3. A system for optoelectronic transmission of a subject image (1) which radiates in at least two mutually different wavelength ranges and/or wavelength distributions having means for reproducing the subject image (1) including photoelectric transducer means (6) through which a geometrical axis (12) extends and provided with a photosensitive surface (11), a lens (2) and optical picture splitter means (3) for simultaneously projecting two images (4, 5) of the subject image on the photosenstive surface (11), and raster scanning means for converting the two reproduced images (4, 5) into two electric video signals (9, 10), said two images (4, 5) being positioned side by side and mutually symmetrically on said surface (11) relative to said geometrical axis (12) with symmetrical brightness distribution and scanned by said scanning means along scanning rasters (7, 8) that are also substantially mutually symmetrical with respect to said geometrical axis of the transducer means, said picture splitter means comprising a geometric-optically homogenous element having a partly transmissive reflecting plane (14) and, two fully reflective planes (15, 16) respectively in front of and behind the partly transmissive reflecting plane (14), the two fully reflective planes intersecting each other on an intersection line extending through the partly transmissive plane (14) at equal inclination angles ($\alpha$) thereto.

4. A system for optoelectronic transmission of a subject image (1) which radiates in at least two mutually different wavelength ranges and/or wavelength distributions having means for reproducing the subject image (1) including photoelectric transducer means (6) provided with a photosensitive surface (11), a lens (2) and optical picture splitter means (3) for simultaneously projecting two images (4,5) of the subject image on the photosensitve surface (11), and raster scanning means for converting the two reproduced images (4,5) into two electric video signals (9,10), said two images (4,5) being positioned side by side and mutually symmetrically on said surface (11) with symmetrical brightness distribution and scanned by said scanning means along scanning rasters (7,8) that are also substantially mutually symmetrical, said picture splitter means (6) comprising a geometric-optically homogeneous element having a partly transmissive reflecting plane (14), and two fully reflective lanes (15, 16) respectively in front of and behind the partly transmissive reflecting plane (14), the two fully reflective planes intersecting each other on an intersection line extending through the partly transmissive plane (14) at equal inclination angles ($\alpha$) thereto.

5. The system according to claim 1, wherein said two images (4,5) on the photosensitve surface (11) are mirror-congruent.

6. The system according to claim 2 or 5, wherein scanning rasters (7,8) are two "dovetailed" half-image rasters mutually displaced by half a line.

7. The system according to claim 1 or 4, wherein said means for reproducing the subject image further includes at least one strip filter (27) which filters out two mutually different wavelength ranges and/or wavelength distributions, whereby at least one stripewise filtered image on the photosensitive surface (11) is produced, and to form optically coded electric video signals, (9,10) when scanned, and electric decoding means (29) for splitting the video signals in accordance with said coding.

8. The system according to claim 7, wherein each of the two decoded electric video signals (9,10) corresponds to a pair of complementary colours.

9. The system according to claim 8, wherein said means for reproducing the subject image further includes strip filters (27,28) ensuring that all four complementary colours lie on the same curve of constant relative albedo for body colours with the optimal colours, under studio lighting.

10. The system according to claim 8, wherein the means for reproducing the subject image further includes strip filters (27,28) ensuring that the pairs of complementary colours lie on television colour axes u and v, and that the complementary colours correspond to the primary colours ($U_1, U_2, U_3, U_4$) of human visual sensation.

11. The system according to claim 7, wherein transmission of one of the video signals requiring a frequency band smaller than that required by the other of the video signals, is accompanied by audio signals in frequency-multiplexed form.

12. The system according to claim 1 or 4 wherein said scanning means includes a switching mechanism for effecting time-sequential scanning of the images and means for transmitting at any given moment only one of the electric video signals (9,10).

13. The system according to claim 12, including intermediate memory means (41,42,43) for storing repeated video signals in time sequence and making the signals available for read out at the same time as simultaneous signals.

14. The system according to claim 13, including a non-linear crispening circuit (44) for adjusting at least one of the repeated video signals to the original signal form.

15. The system according to claim 13, wherein said two reproduced images are approximately congruent and mutually point-symmetrical, and the video signals corresponding to a raster line are stored in the intermediate memory means (41,42,43) for the duration of a line period.

16. The system according to claim 13 wherein said two images (4,5) are symmetrical with respect to a symmetry line substantially perpendicular to the line direction of scanning and the video signals (9,10) corresponding to a raster line are stored in the intermediate memory means (41,42,43) for the duration of a line period.

17. The system according to claim 13, wherein said two images (4,5) are symmetrical with respect to a symmetry line parallel to the line direction of scanning, said images being scanned by interlaced scanning, and the video signals (9,10) corresponding to a half-image scan are stored in the intermediate memory means (41,42,43) for the duration of a half-image period ± half a line period.

18. The system according to claim 17, wherein the scanning means includes an interlaced raster, of a coincidence circuit (38) producing an identification signal (J) for assigning the electric video signals (9,10) to the colour separation scanned in each case, the identification signal (J) being formed from horizontal and vertical synchronization signals (H,V) generated by the coincidence circuit (38).

19. The system according to claim 17, including program memory means (36) for sequentially storing the video signals, and issuing simultaneously available electric video signals (9,10) from the intermediate memory means (41,42,43) under control of the synchronization signals, to avoid the effects of band jitter and/or other disturbing influences.

20. The system according to claim 3 or 4 wherein said picture splitter element (6) comprises two optical 30°/60°/90° prisms (19,20) which are permanently interconnected by a partly transmissive coating (14).

21. The system according to claim 3 or 4 including image-limiting means (21) in the picture splitter element (6) for preventing mutual overlap of the two images (4,5) on the photosensitive surface (11).

22. The system according to claim 3 or 4 including an intermediate image plane (23) on which said lens (2)

projects an intermediate image, an intermediate optical assembly (22) for projecting said intermediate image through the picture splitter means (6) on the photosensitive surface (11), and image limitation means (24), for restricting the intermediate image plane (23).

23. The system according to claim 22 wherein said means for reproducing the subject image further includes a strip filter in the intermediate image plane (23), and a uniformly filtering filter means between the splitter means and the photosensitive surface, for coding the electric video signals (9,10) with coded quotas corresponding to at least three different colour separations.

24. A method of transmitting a multi-colored image (1) of a subject, including the steps of: optically splitting said subject image into two mirror images of each other (4,5) reproduced on a surface (11) of a transducer (6) in mutually symmetrical relation to a geometrical axis (12) of the transducer; and scanning said two mirror images on said surface of the transducer along scanning rasters (7,8) also arranged in substantially mutual symmetrical relation to said geometrical axis of the transducer to produce two corresponding video signals (9,10).

25. In a method of transmitting a multi-colored image (1) of a subject by optically splitting the subject image into two mutually symmetrical images (4,5) that are scanned to produce two corresponding video signals (9,10), said optical splitting of the subject image, including the steps of: projecting an incident beam from said subject image onto a partially transmissive reflecting plane (14) through which the beam is partially transmitted and from which the beam is partially reflected; intercepting the partially transmitted and reflected beams on two fully reflective planes (15,16) intersecting each other on the partially transmissive reflecting plane at equal angles ($\alpha$) thereto; and receiving the two images on a common scanning surface (11) onto which the beams are reflected from the two fully reflective planes.

26. In a color video camera of the type employing a single color pick-up tube having a geometrical axis intersecting an image surface on a line of symmetry with respect to which symmetrical image distortion and sensitivity variation occurs, the improvement comprising optical means receiving a light image and dividing the same into two mirror images of each other with respect to said line of symmetry on the image surface, and scanning control means for said pick-up tube causing the mirror images on said image surface to be scanned in substantially symmetrical relation to each other relative to said line of symmetry.

* * * * *